United States Patent
Eschenburg et al.

(10) Patent No.: US 10,513,146 B2
(45) Date of Patent: Dec. 24, 2019

(54) AXLE ASSEMBLY HAVING A COUNTERSHAFT

(71) Applicant: ArvinMeritor Technology, LLC, Troy, MI (US)

(72) Inventors: Dale Eschenburg, Rochester Hills, MI (US); Adam P. Sadlik, Clarkston, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 350 days.

(21) Appl. No.: 15/667,677

(22) Filed: Aug. 3, 2017

(65) Prior Publication Data

US 2019/0039409 A1 Feb. 7, 2019

(51) Int. Cl.
| | | |
|---|---|---|
| *B60B 27/00* | (2006.01) | |
| *B60B 35/12* | (2006.01) | |
| *B60K 17/36* | (2006.01) | |
| *F16D 11/14* | (2006.01) | |
| *F16D 25/061* | (2006.01) | |
| *F16D 1/092* | (2006.01) | |

(52) U.S. Cl.
CPC ........ *B60B 27/0031* (2013.01); *B60B 27/001* (2013.01); *B60B 35/125* (2013.01); *B60K 17/36* (2013.01); *F16D 1/092* (2013.01); *F16D 11/14* (2013.01); *F16D 25/061* (2013.01)

(58) Field of Classification Search
CPC ... B60B 27/00; B60B 27/0031; B60B 27/001; B60B 35/125; B60K 17/36; F16D 11/14; F16D 25/061
See application file for complete search history.

(56) References Cited

U.S. PATENT DOCUMENTS

| | | | |
|---|---|---|---|
| 3,199,375 | A | 8/1965 | Rosen et al. |
| 4,263,824 | A * | 4/1981 | Mueller ................. B60T 8/171 |
| | | | 475/86 |
| 5,989,143 | A | 11/1999 | Bell et al. |
| 8,382,633 | B2 | 2/2013 | Cooper et al. |
| 8,398,520 | B1 | 3/2013 | Bassi et al. |
| 8,523,738 | B2 | 9/2013 | Morscheck et al. |
| 8,562,479 | B2 | 10/2013 | Hamperl et al. |
| 8,651,994 | B2 | 2/2014 | Bassi et al. |
| 8,851,212 | B2 * | 10/2014 | Kahl ....................... F16H 48/06 |
| | | | 180/24.11 |

(Continued)

FOREIGN PATENT DOCUMENTS

| | | |
|---|---|---|
| DE | 1430473 A1 | 10/1968 |
| DE | 19805881 C1 | 6/1999 |

(Continued)

OTHER PUBLICATIONS

United States Patent and Trademark Office, U.S. Appl. No. 15/347,426, filed Nov. 9, 2016.

(Continued)

*Primary Examiner* — Huan Le
(74) *Attorney, Agent, or Firm* — Brooks Kushman P.C.

(57) ABSTRACT

An axle assembly having a countershaft. The countershaft may be disposed in an axle housing. An axle shaft may be disposed in the countershaft. A first clutch may control rotation of the countershaft with respect to the axle shaft. A second clutch may control rotation of the countershaft with respect to the axle housing.

20 Claims, 6 Drawing Sheets

(56) References Cited

U.S. PATENT DOCUMENTS

| | | |
|---|---|---|
| 8,911,321 B2 | 12/2014 | Ziech et al. |
| 9,020,715 B2 | 4/2015 | Nellums et al. |
| 9,102,232 B2 | 8/2015 | Ziech et al. |
| 9,109,635 B2 | 8/2015 | Boothby et al. |
| 9,121,455 B2 | 9/2015 | Cooper |
| 9,284,995 B2 | 3/2016 | Lawson et al. |
| 9,428,050 B2 | 8/2016 | Ziech et al. |
| 9,457,655 B2 | 10/2016 | Ziech et al. |
| 9,457,656 B2 | 10/2016 | Ziech et al. |
| 9,457,657 B2 | 10/2016 | Ziech et al. |
| 2002/0187870 A1 | 12/2002 | Staheli et al. |
| 2011/0218715 A1 | 9/2011 | Duraiswamy et al. |
| 2012/0202640 A1 | 8/2012 | Morimoto |
| 2015/0247562 A1* | 9/2015 | Valente .............. B60K 23/0808 475/223 |
| 2016/0363205 A1 | 12/2016 | Tiziani et al. |
| 2017/0144540 A1* | 5/2017 | Kincaid ............... B60K 17/348 |

FOREIGN PATENT DOCUMENTS

| | | |
|---|---|---|
| WO | 2006004489 A1 | 1/2006 |
| WO | 2016205480 A1 | 12/2016 |

OTHER PUBLICATIONS

United States Patent and Trademark Office, U.S. Appl. No. 16/059,395, filed Aug. 9, 2018.

United States Patent and Trademark Office, U.S. Appl. No. 15/964,780, filed Apr. 27, 2018.

European Patent Office, Extended European Search Report for corresponding European Application No. 18172416.2-1012, dated Oct. 25, 2018, 6 pages.

Dale Eschenburg, et al, United States Patent and Trademark Office, U.S. Appl. No. 16/059,226, filed Aug. 9, 2018.

* cited by examiner

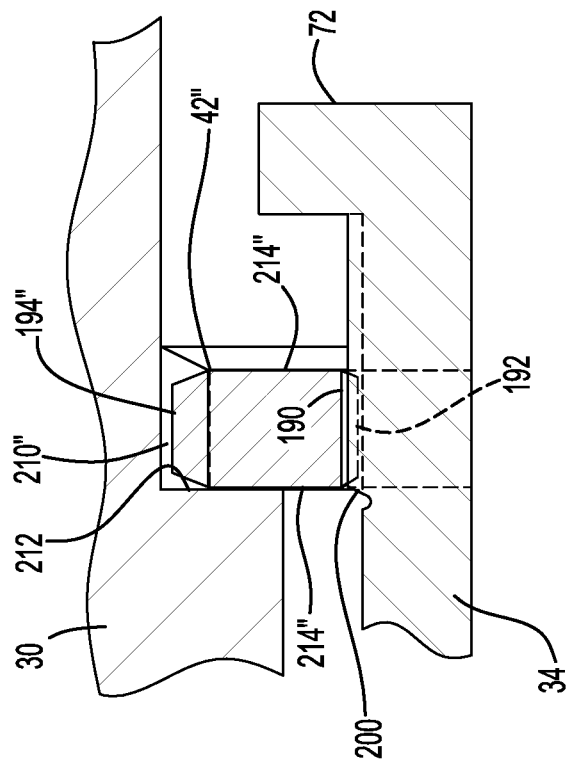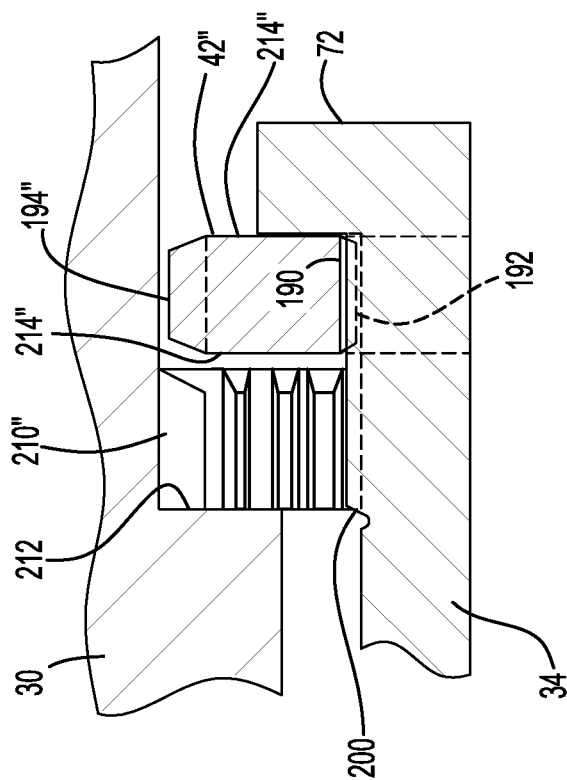

US 10,513,146 B2

AXLE ASSEMBLY HAVING A COUNTERSHAFT

TECHNICAL FIELD

This disclosure relates to an axle assembly that may have a countershaft that may be associated with a hub gear reduction arrangement.

BACKGROUND

An axle assembly having hub reduction gears is disclosed in U.S. Pat. No. 9,109,635.

SUMMARY

In at least one embodiment, an axle assembly is provided. The axle assembly may have an axle housing, a countershaft, an axle shaft, a first clutch, and a second clutch. The countershaft may be disposed in the axle housing. The axle shaft may be disposed in the countershaft. The countershaft and the axle shaft may be rotatable about an axis. The first clutch may control rotation of the countershaft with respect to the axle shaft. The second clutch may control rotation of the countershaft with respect to the axle housing.

In at least one embodiment, an axle assembly is provided. The axle assembly may have an axle housing, a countershaft, an axle shaft, a hub, a hub gear reduction arrangement, a first clutch, and a second clutch. The countershaft may be disposed in the axle housing. The axle shaft may extend through the countershaft. The hub may be rotatably disposed on the axle housing. The countershaft, axle shaft, and hub may be rotatable about an axis. The hub gear reduction arrangement may be disposed in the hub and may transmit torque from the axle shaft to the hub. The hub gear reduction arrangement may include a first side gear, a second side gear, and a pinion gear. The first side gear may be disposed on the axle shaft. The second side gear may be disposed on the countershaft. The pinion gear may be in meshing engagement with the first side gear and the second side gear. The first clutch may control rotation of the countershaft with respect to the axle shaft. The second clutch may control rotation of the countershaft with respect to the axle housing.

BRIEF DESCRIPTION OF THE DRAWINGS

FIGS. 4A-4B and 5A-5B illustrate configurations for a second clutch that may be provided with the axle assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
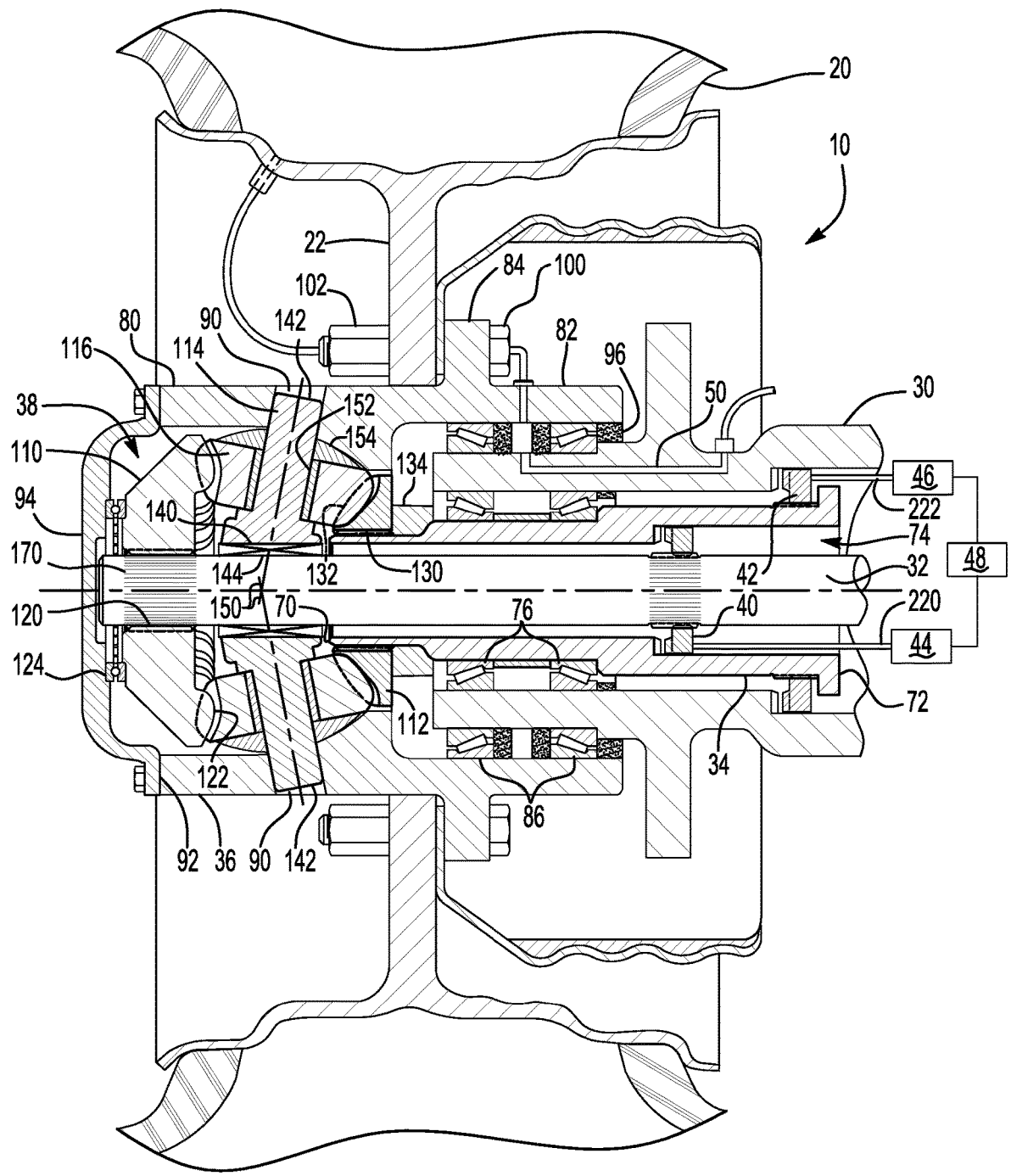
FIG. 1 is a section view of a portion of an axle assembly that includes a hub reduction gear arrangement.

Referring to FIG. 1, a portion of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

One or more axle assemblies may be provided with the vehicle. For example, the axle assembly 10 may be a single drive axle assembly or may be configured as part of a tandem axle configuration or multi-axle configuration that may include a plurality of axle assemblies that may be connected in series.

The axle assembly 10 may be a drive axle that may receive torque from a power source, such as an internal combustion engine or electric motor, and may provide torque to one or more traction wheel assemblies that may include a tire 20 mounted on a wheel 22. Only a portion of the axle assembly 10 that is disposed at a wheel end is shown in FIG. 1. As such, it is to be understood that the portion of the axle assembly 10 that is shown may also be provided at the opposite end of the axle assembly 10 to support at least one other traction wheel assembly.

In at least one configuration, the axle assembly 10 may include an axle housing 30, an axle shaft 32, a countershaft 34, a hub 36, a hub gear reduction arrangement 38, a first clutch 40, a second clutch 42, a first actuator 44, a second actuator 46, and a controller 48.

The axle housing 30 may receive various components of the axle assembly 10. In addition, the axle housing 30 may facilitate mounting of the axle assembly 10 to the vehicle. The axle housing 30 may receive at least a portion of a differential that may transmit torque to the vehicle traction wheel assemblies and permit the traction wheel assemblies to rotate at different velocities in a manner known by those skilled in the art. The end of the axle housing 30 may be referred to as a spindle or may include a spindle. The spindle may define a hole through which the axle shaft 32 may extend. The spindle may also support one or more bearings as will be discussed in more detail below. In addition, the spindle may include a passage 50 that may be part of a tire inflation system that may provide pressurized gas to control the inflation pressure of the tire 20.

The axle shaft 32 may be at least partially disposed in the axle housing 30. In addition, the axle shaft 32 may be rotatable about an axis 60. The axle shaft 32 may have a first end and a second end. The first end may be disposed in the axle housing 30 and may be operatively connected to the differential. The second end may be disposed opposite the first end and may be located outside of the axle housing 30 or may be located near an end of the axle housing 30. The second end may be operatively connected to the hub gear reduction arrangement 38. The axle shaft 32 may extend through the countershaft 34.

The countershaft 34 may be at least partially disposed inside the axle housing 30. The countershaft 34 may be spaced apart from and may not engage the axle housing 30. In addition, the countershaft 34 may be rotatable about the axis 60. The countershaft 34 may have a first countershaft end 70, a second countershaft end 72, and a countershaft hole 74. In addition, the countershaft 34 may be rotatably supported by one or more countershaft bearings 76.

The first countershaft end 70 may be disposed at an end of the countershaft 34 that is disposed proximate the hub gear reduction arrangement 38. For example, the first countershaft end 70 may be disposed outside the axle housing 30 and may be received in the hub 36. The first countershaft end 70 may help support the hub gear reduction arrangement 38.

The second countershaft end 72 may be disposed opposite the first countershaft end 70. The second countershaft end 72 may be disposed inside the axle housing 30. The second countershaft end 72 may include or may be configured as a flange that may extend away from the axis 60 to inhibit axial movement of the countershaft 34 toward the hub gear reduction arrangement 38.

The countershaft hole 74 may extend from the first countershaft end 70 to the second countershaft end 72. The axle shaft 32 may extend through the countershaft hole 74. Moreover, the countershaft hole 74 may receive the axle shaft 32 such that the countershaft 34 may be spaced apart from and may not engage the axle shaft 32.

One or more countershaft bearings 76 may rotatably support the countershaft 34. The countershaft bearings 76 may be disposed inside the axle housing 30 and may extend continuously around an exterior surface of the countershaft 34 that may be disposed opposite the countershaft hole 74. The countershaft bearings 76 may be axially positioned or positioned along the axis 60 between the first countershaft end 70 and the second countershaft end 72. The countershaft bearings 76 may have any suitable configuration. For example, the countershaft bearings 76 may be roller bearing assemblies that may include a plurality of roller bearing elements that may be disposed between an inner race and an outer race. As such, the inner race may be disposed on the countershaft 34 and the outer race may be disposed on the axle housing 30.

The hub 36 may receive a portion of one or more components of the axle assembly 10, such as the axle housing 30, axle shaft 32, countershaft 34, and/or the hub gear reduction arrangement 38. The hub 36 may be spaced apart from and may not engage the axle housing 30, the axle shaft 32, and the countershaft 34. In at least one configuration, the hub 36 may include a first hub portion 80, a second hub portion 82, and a hub mounting flange 84. In addition, the hub 36 may be rotatably supported by one or more wheel bearings 86.

The first hub portion 80 may extend away from the axle housing 30 and may at least partially receive the hub gear reduction arrangement 38. The first hub portion 80 may have a single piece or a multi-piece configuration and may define one or more spider shaft holes 90 that may receive a shaft of a spider of the hub gear reduction arrangement 38 as will be discussed in more detail below. The first hub portion 80 may also have a first hub portion end surface 92 that may face away from the axle housing 30. A hub cap 94 may be disposed on the first hub portion end surface 92. For example, the hub cap 94 may be secured to the first hub portion end surface 92 with a plurality of fasteners, such as bolts.

The second hub portion 82 may extend toward the axle housing 30 and may receive a portion of the axle housing 30. The second hub portion 82 may also receive one or more wheel bearings 86 and a hub seal 96. The hub seal 96 may extend continuously around the axis 60 and may extend from the axle housing 30 to the hub 36 to help retain lubricant inside the second hub portion 82 and inhibit contaminants from entering the hub 36.

The hub mounting flange 84 may extend away from the axis 60. For instance, the hub mounting flange 84 may extend substantially perpendicular to the axis 60 in one or more configurations. The hub mounting flange 84 may facilitate mounting of the wheel 22. For example, the hub mounting flange 84 may include a set of mounting lug holes that may each receive a wheel mounting lug 100. Each wheel mounting lug 100 may extend through a corresponding hole in the wheel 22. A lug nut 102 may be threaded onto each wheel mounting lug 100 to secure the wheel 22 to the hub 36.

One or more wheel bearings 86 may rotatably support the hub 36. The wheel bearings 86 may be disposed inside the second hub portion 82 of the hub 36 and may extend continuously around an exterior surface of the axle housing 30 that may be disposed opposite the countershaft 34. As such, the hub 36 may be rotatably disposed on the axle housing 30 and may be rotatable about the axis 60 with respect to the axle housing 30. In at least one configuration, the wheel bearings 86 may be axially positioned or positioned along the axis 60 between the hub gear reduction arrangement 38 and the second clutch 42. In addition, the wheel bearings 86 may be disposed opposite and may extend around the countershaft bearings 76. The wheel bearings 86 may have any suitable configuration. For example, the wheel bearings 86 may be roller bearing assemblies that may include a plurality of roller bearing elements that may be disposed between an inner race and an outer race. As such, the inner race may be disposed on the axle housing 30 and the outer race may be disposed on the hub 36.

The hub gear reduction arrangement 38 may operatively connect the axle shaft 32 to the hub 36. The hub gear reduction arrangement 38 may be at least partially disposed in the hub 36 and may transmit torque from the axle shaft 32 to the hub 36. In at least one configuration, the hub gear reduction arrangement 38 may include a first side gear 110, a second side gear 112, a spider 114, and one or more pinion gears 116.

The first side gear 110 may be disposed inside the hub 36. For instance, the first side gear 110 may be disposed in the first hub portion 80 and may be disposed on the axle shaft 32. The first side gear 110 may include a first side gear hole 120 and a first gear portion 122.

The first side gear hole 120 may be disposed along the axis 60 and may receive the axle shaft 32 such that the first side gear 110 may rotate with the axle shaft 32. For example, the first side gear hole 120 may have a spline that may mate with a corresponding spline on the axle shaft 32 such that the first side gear 110 may not rotate with respect to the axle shaft 32.

The first gear portion 122 may face toward and may be spaced apart from the spider 114. The first gear portion 122 may have a set of teeth that may be arranged around the axis 60 and that may mate with teeth on one or more pinion gears 116. A thrust washer or bearing 124 may be disposed between the first gear portion 122 and the hub cap 94 to inhibit axial movement of the first side gear 110 toward the hub cap 94.

The second side gear 112 may be partially or completely disposed inside the hub 36. For instance, the second side gear 112 may be disposed in the first hub portion 80 and may be disposed on the countershaft 34. The second side gear 112 may include a second side gear hole 130 and a second gear portion 132.

The second side gear hole 130 may be disposed along the axis 60 and may receive the countershaft 34 such that the second side gear 112 may rotate with the countershaft 34. For example, the second side gear hole 130 may have a spline that may mate with a corresponding spline on the countershaft 34 such that the second side gear 112 may not rotate with respect to the countershaft 34.

The second gear portion 132 may face toward and may be spaced apart from the spider 114. The second gear portion 132 may have a set of teeth that may be arranged around the axis 60 and that may mate with teeth on one or more pinion gears 116. A spacer 134 or bearing may be disposed between the second gear portion 132 and a wheel bearing 86 to inhibit axial movement of the second side gear 112 toward the axle housing 30.

The spider 114 may be partially or completely disposed inside the hub 36 and may be axially positioned between the first side gear 110 and the second side gear 112. The spider 114 may include a spider hole 140 and one or more spider shafts 142.

The spider hole 140 may be disposed along the axis 60. The axle shaft 32 may extend through the spider hole 140. In addition, a bearing 144 may be disposed in the spider hole 140. The bearing 144 may receive the axle shaft 32 and may facilitate rotation of the spider 114 with respect to the axle shaft 32.

Figure 6:
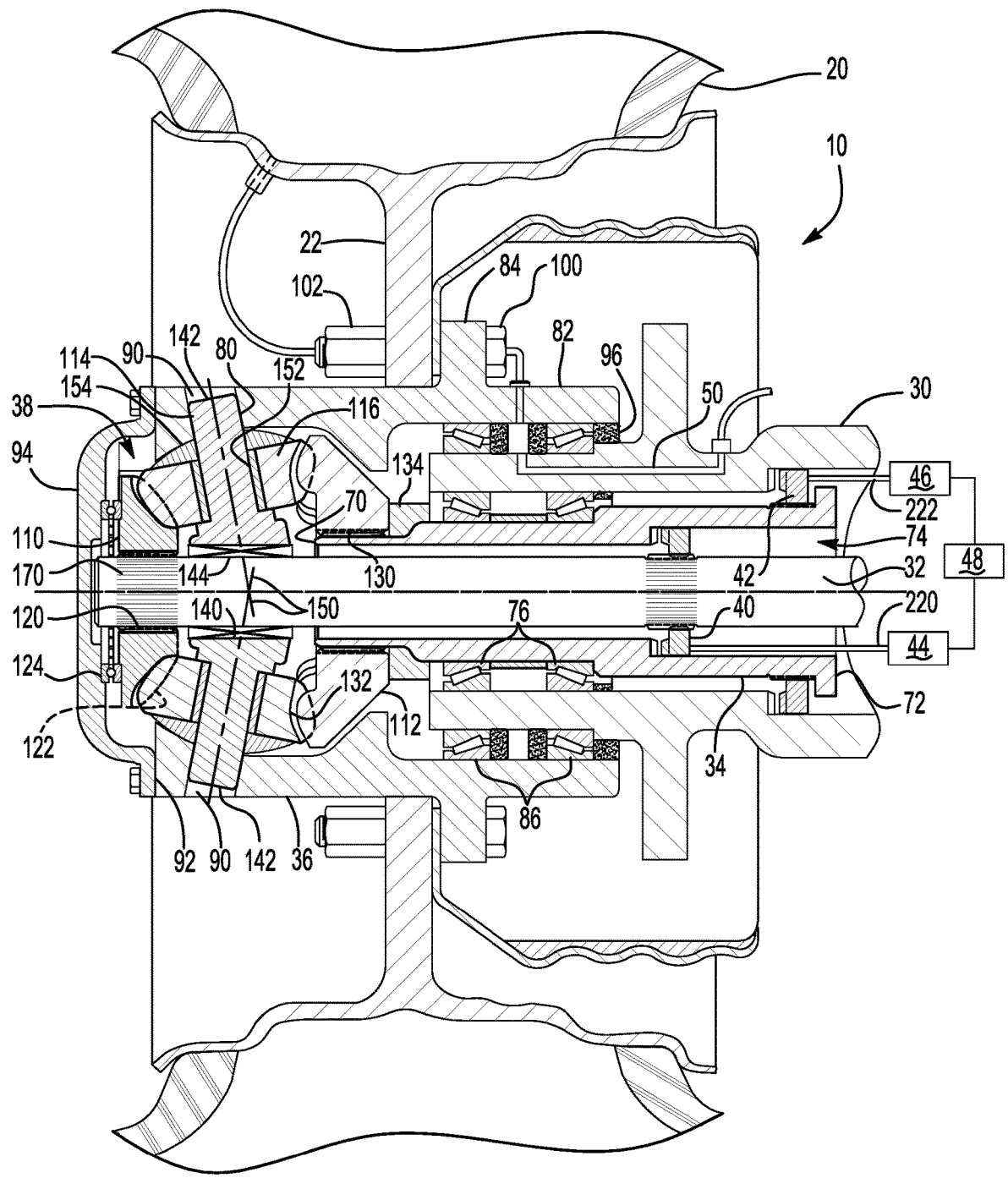
FIG. 6 is a section view of a portion of an axle assembly having another configuration of a hub reduction gear arrangement.

One or more spider shafts 142 may extend away from the axis 60. For example, the spider shafts 142 may extend along a spider shaft axis 150. The spider shaft axis 150 may intersect the axis 60 and may be disposed at a non-perpendicular angle with respect to the axis 60 to help provide a desired gear reduction ratio. In the configuration shown in FIG. 1, the spider shaft axes 150 extend at an angle that extends away from the hub cap 94. In the configuration shown in FIG. 6, the spider shaft axes 150 extend at an angle that extends toward the hub cap 94. Each spider shaft 142 may be received in a spider shaft hole 90 of the hub 36 and may have any suitable configuration. For example, the spider shafts 142 may be substantially cylindrical in one or more embodiments.

A pinion gear 116 may be rotatably disposed on a corresponding spider shaft 142. The pinion gears 116 may be disposed in the first hub portion 80. For example, each pinion gear 116 may have a pinion gear hole that may receive a corresponding spider shaft 142. Optionally, a bearing 152 may be disposed in the pinion gear hole between the spider shaft 142 and the pinion gear 116 to facilitate rotation of the pinion gear 116 with respect to the spider shaft 142. A retaining feature 154, such as a washer or a thrust bearing, may optionally be provided with each pinion gear 116 to inhibit movement of the pinion gear 116 along the spider shaft axis 150 in a direction that extends away from the axis 60. The retaining feature 154 may engage an inner wall of the first hub portion 80. Each pinion gear 116 may include a set of teeth that mate with teeth on the first side gear 110 and teeth on the second side gear 112. As such, the pinion gears 116 may be in meshing engagement with the first side gear 110 and the second side gear 112.

The first clutch 40 may control rotation of the countershaft 34 with respect to the axle shaft 32. In at least one configuration, the first clutch 40 may extend continuously around the axle shaft 32. In addition, the first clutch 40 may be received inside the countershaft 34. For example, the first clutch 40 may be axially positioned between the second side gear 112 and the second clutch 42. The countershaft 34 may be rotatable about the axis 60 with respect to the axle shaft 32 when the first clutch 40 is in a disengaged position in which the first clutch 40 does not couple the countershaft 34 to the axle shaft 32. The countershaft 34 may not rotate about the axis 60 with respect to the axle shaft 32 when the first clutch 40 is in an engaged position in which the first clutch 40 couples the countershaft 34 to the axle shaft 32.

The first clutch 40 may be provided in various configurations. For example, the first clutch 40 may be configured as a friction clutch that may include multiple clutch plates. A first set of clutch plates may be coupled to and may rotate with the axle shaft 32. A second set of clutch plates may be coupled to and may rotate with the countershaft 34.

Figure 2A:
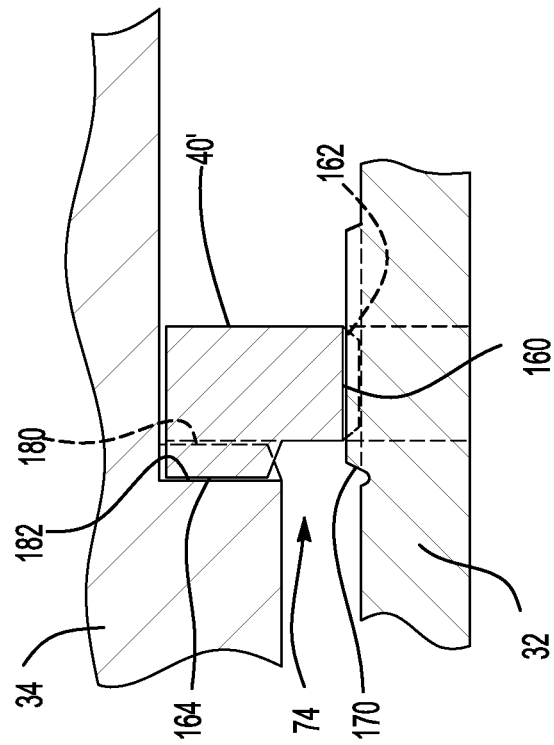
FIGS. 2A-2B and 3A-3B illustrate configurations for a first clutch that may be provided with the axle assembly.
Figure 2B:
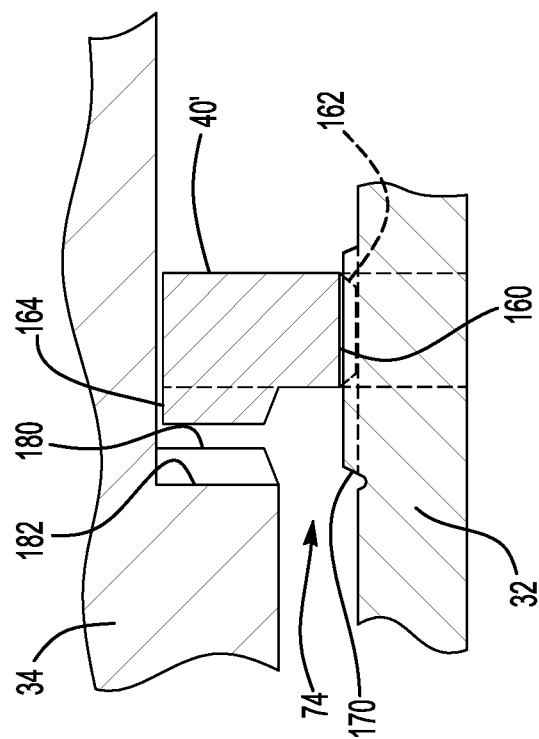

Referring to FIGS. 2A and 2B, the first clutch is designated with reference number 40' and is depicted as a clutch collar that may be slidable along the axle shaft 32. More specifically, the first clutch 40' may slide or move along the axis 60 between a disengaged position and an engaged position. In such a configuration, the first clutch 40' may be generally ring-shaped and may have a first clutch hole 160, a first clutch spline 162, and a first clutch gear 164.

The first clutch hole 160 may be a through hole that may extend through the first clutch 40'. The first clutch hole 160 may extend around the axis 60 and may receive the axle shaft 32.

The first clutch spline 162 may include a set of spline teeth that may be disposed in the first clutch hole 160. The spline teeth may be arranged around the axis 60 and may extend toward the axis 60. In addition, the spline teeth may extend substantially parallel to the axis 60. The first clutch spline 162 may mesh with a corresponding axle shaft spline 170 that may be provided on the outside of the axle shaft 32. The axle shaft spline 170 may also have teeth that may be arranged around the axis 60 and that may extend substantially parallel to the axis 60. As such, the first clutch spline 162 may cooperate with the axle shaft spline 170 to permit axial movement of the first clutch 40' along the axle shaft 32 while limiting or inhibiting rotational movement of the first clutch 40' about the axis 60 with respect to the axle shaft 32.

The first clutch gear 164 may include a set of teeth that may be arranged on a side or face of the first clutch 40' that may face toward the hub gear reduction arrangement 38. As such, the teeth of the first clutch gear 164 may extend in an axial direction toward the hub gear reduction arrangement 38 and away from the second clutch 42. The teeth of the first clutch gear 164 may be arranged in a repeating pattern around the axis 60 and may selectively engage a countershaft gear 180 that may be provided with the countershaft 34. The countershaft gear 180 may be disposed in the countershaft hole 74 and may have teeth that may be arranged on a step 182 of the countershaft 34 that may face away from the hub gear reduction arrangement 38 and toward the first clutch 40'. The teeth of the countershaft gear 180 may extend in an axial direction toward the teeth of the first clutch gear 164 and may be arranged in a repeating pattern around the axis 60. The first clutch gear 164 may be spaced apart from and may not engage the countershaft gear 180 when the first clutch 40' is disposed in a disengaged position as shown in FIG. 2A. The first clutch gear 164 may engage and mesh with the countershaft gear 180 when the first clutch 40' is disposed in an engaged position as shown in FIG. 2B.

Figure 3B:
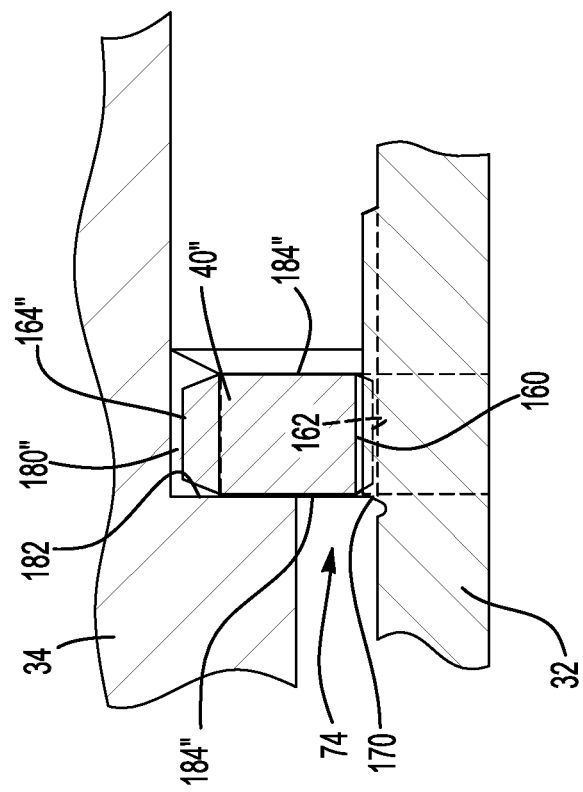
Figure 3A:
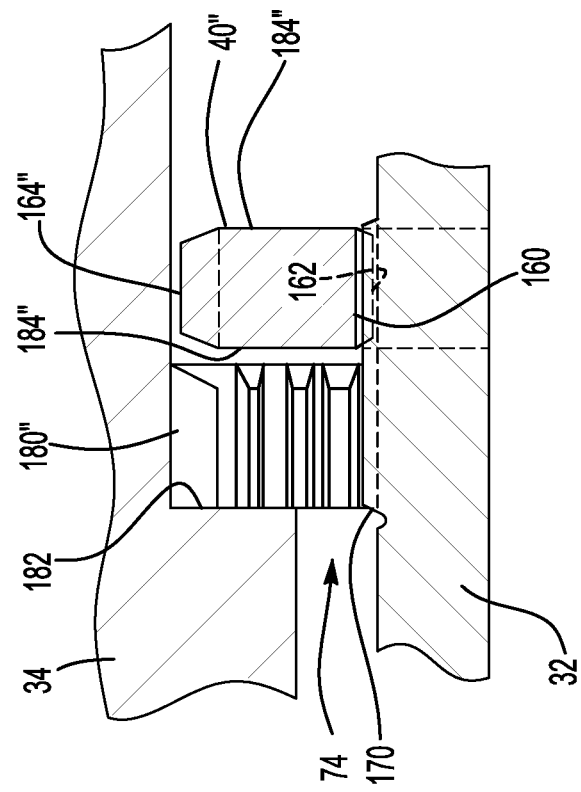

Referring to FIGS. 3A and 3B, another configuration of the first clutch 40" is shown. In this configuration, the first clutch 40" is again depicted as a clutch collar that may be slidable along the axle shaft 32 between a disengaged and an engaged position. The first clutch 40" may have a first clutch hole 160 and a first clutch spline 162 as previously described. The first clutch gear 164" may include a set of teeth that may be disposed opposite the first clutch hole 160 and may face away from the first clutch hole 160 and the axis 60. As such, the teeth of the first clutch gear 164" may extend in a radial direction away from the axis 60 and may be positioned between opposing lateral sides 184" of the first clutch 40". The teeth of the first clutch gear 164" may be arranged in a repeating pattern around the axis 60 and the first clutch hole 160 and may selectively engage a countershaft gear 180" that may be provided with the countershaft 34. The countershaft gear 180" may be disposed in the countershaft hole 74 and may have teeth that may extend toward the axis 60 such that the tip surfaces of the teeth face toward the axis 60 and are arranged around the first clutch gear 164". The teeth of the countershaft gear 180" may also extend in an axial direction from the step 182 toward the first clutch 40" may be arranged in a repeating pattern around the axis 60. The first clutch gear 164" may be spaced apart from and may not engage the countershaft gear 180" when the first clutch 40" is disposed in a disengaged position as shown in FIG. 3A. The first clutch gear 164" may engage and mesh with the countershaft gear 180" when the first clutch 40" is disposed in an engaged position as shown in FIG. 3B.

Referring to FIG. 1, the second clutch 42 may control rotation of the countershaft 34 with respect to the axle housing 30. The second clutch 42 may be received inside the axle housing 30. For example, the second clutch 42 may be axially positioned adjacent to the second countershaft end 72. The second clutch 42 may extend continuously around the countershaft 34. As such, the first clutch 40 may be disposed closer to the axis 60 than the second clutch 42. The countershaft 34 may be rotatable about the axis 60 with respect to the axle housing 30 when the second clutch 42 is in a disengaged position in which the second clutch 42 does not couple the countershaft 34 to the axle housing 30. The countershaft 34 may not rotate about the axis 60 with respect to the axle housing 30 when the second clutch 42 is in an engaged position in which the second clutch 42 couples the countershaft 34 to the axle housing 30.

The second clutch 42 may be provided in various configurations like the first clutch 40. For example, the second clutch 42 may be configured as a friction clutch that may include multiple clutch plates. A first set of clutch plates may be coupled to and may rotate with the countershaft 34. A second set of clutch plates may be coupled to the axle housing 30.

Figure 4A:
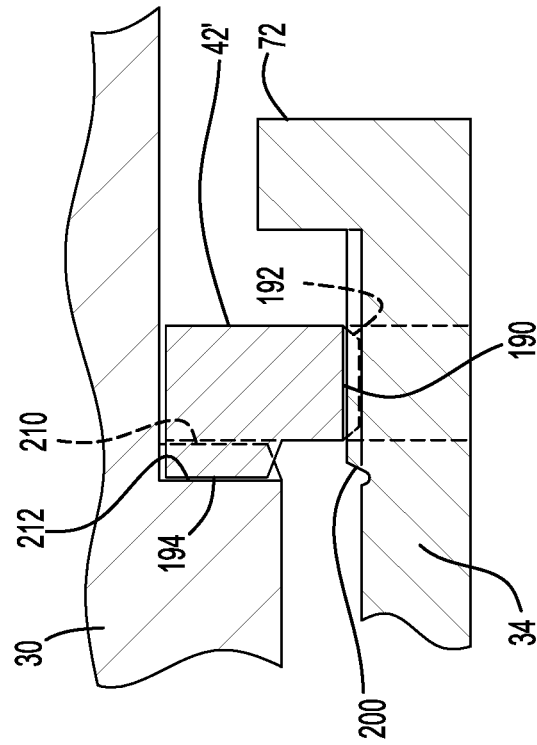
Figure 4B:
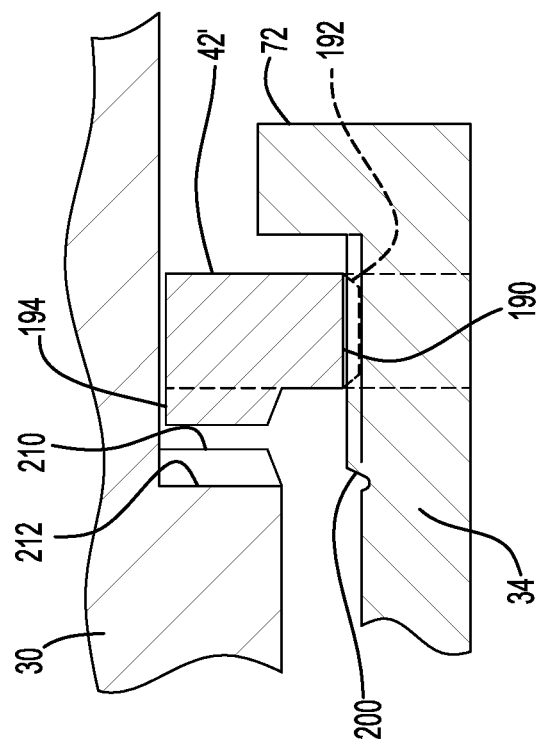

Referring to FIGS. 4A and 4B, the second clutch is designated with reference number 42' and is depicted as a clutch collar that may be slidable along the countershaft 34. More specifically, the second clutch 42' may slide or move along the axis between a disengaged position and an engaged position. In such a configuration, the second clutch 42' may be generally ring-shaped and may have a second clutch hole 190, a second clutch spline 192, and a second clutch gear 194.

The second clutch hole 190 may be a through hole that may extend through the second clutch 42'. The second clutch hole 190 may extend around the axis 60 and may receive the countershaft 34.

The second clutch spline 192 may include a set of spline teeth that may be disposed in the second clutch hole 190. The spline teeth may be arranged around the axis 60 and may extend toward the axis 60. In addition, the spline teeth may extend substantially parallel to the axis 60. The second clutch spline 192 may mesh with a corresponding countershaft spline 200 that may be provided on the inside of the axle housing 30. The countershaft spline 200 may also have teeth that may be arranged around the axis 60 and that may extend substantially parallel to the axis 60. As such, the second clutch spline 192 may cooperate with the countershaft spline 200 to permit axial movement of the first clutch 40 along the countershaft 34 while limiting or inhibiting rotational movement of the second clutch 42' about the axis 60 with respect to the countershaft 34.

The second clutch gear 194 may include a set of teeth that may be arranged on a side or face of the second clutch 42' that may face toward the hub gear reduction arrangement 38. As such, the teeth of the second clutch gear 194 may extend in an axial direction toward the hub gear reduction arrangement 38. The teeth of the second clutch gear 194 may be arranged in a repeating pattern around the axis 60 and may selectively engage an axle housing gear 210 that may be provided with the axle housing 30. The axle housing gear 210 may be disposed in the axle housing 30 and may have teeth that may be arranged on a step 212 of the axle housing 30 that may face away from the hub gear reduction arrangement 38 and toward the second clutch 42'. The teeth of the axle housing gear 210 may extend in an axial direction toward the teeth of the second clutch gear 194 and may be arranged in a repeating pattern around the axis 60. The second clutch gear 194 may be spaced apart from and may not engage the axle housing gear 210 when the second clutch 42' is disposed in a disengaged position as shown in FIG. 4A. The second clutch gear 194 may engage and mesh with the axle housing gear 210 when the second clutch 42' is disposed in an engaged position as shown in FIG. 4B.

Referring to FIGS. 5A and 5B, another configuration of the second clutch 42" is shown. In this configuration, the second clutch 42" is again depicted as a clutch collar that may be slidable along the countershaft 34 between a disengaged and an engaged position. The second clutch 42" may have a second clutch hole 190 and a second clutch spline 192 as previously described. The second clutch gear 194" may include a set of teeth that may be disposed opposite the second clutch hole 190 and may face away from the second clutch hole 190 and the axis 60. As such, the teeth of the second clutch gear 194" may extend in a radial direction away from the axis 60 and may be positioned between opposing lateral sides 214" of the first clutch 40". The teeth of the second clutch gear 194" may be arranged in a repeating pattern around the axis 60 and the second clutch hole 190 and may selectively engage an axle housing gear 210" that may be provided with the axle housing 30. The axle housing gear 210" may be disposed in the axle housing 30 and may have teeth that may extend toward the axis 60 such that the tip surfaces of the teeth face toward the axis 60 and are arranged around the second clutch gear 194". The teeth of the axle housing gear 210" may also extend in an axial direction from the step 212 toward the second clutch 42" and may be arranged in a repeating pattern around the axis 60. The second clutch gear 194" may be spaced apart from and may not engage the axle housing gear 210" when the second clutch 42" is disposed in a disengaged position as shown in FIG. 5A. The second clutch gear 194" may engage and mesh with the axle housing gear 210" when the second clutch 42" is disposed in an engaged position as shown in FIG. 5B.

Referring to FIG. 1, the first actuator 44 may actuate the first clutch between the disengaged position and the engaged position. The first actuator 44 may be of any suitable type. For example, the first actuator 44 may be a pneumatic actuator, hydraulic actuator, electrical actuator, or an electromagnetic actuator. The first actuator 44 may exert force that may engage the first and second sets of clutch plates so that torque may be transmitted between the axle shaft 32 and the countershaft 34 when the first clutch has clutch plates. The first and second sets of clutch plates may be disengaged and may not cooperate to transmit torque between the axle shaft 32 and the countershaft 34 when sufficient engagement force is not provided with the first actuator 44. The first actuator 44 may be operatively coupled to the first clutch 40 with a first linkage 220, such as a rod, shaft, or shift fork.

The second actuator 46 may actuate the second clutch between the disengaged position and the engaged position. The second actuator 46 may be of any suitable type. For example, the second actuator 46 may be a pneumatic actuator, hydraulic actuator, electrical actuator, or an electromagnetic actuator. The second actuator 46 may exert force that may engage clutch plates when employed with a second clutch having clutch plates. The second actuator 46 may be operatively coupled to the second actuator 46 with a second linkage 222, such as a rod, shaft or shift fork.

The controller 48 may monitor and control operation of the axle assembly 10. The controller 48 may include one or more electronic controllers or control modules that may monitor and/or control various components of the axle assembly 10. For example, the controller 48 may be configured to control actuation of the first clutch and the second clutch, such as by controlling the first actuator 44 and the second actuator 46. Communication associated with the controller 48 is represented by the double arrowed lines that are located adjacent to the controller 48.

The controller 48 may control the positioning of the first clutch 40, 40', 40" and the second clutch 42, 42', 42" between four main position combinations. These position combinations are referred to as an open condition, a gear reduction condition, an intermediate condition, and a closed condition.

In the open condition, the first clutch 40, 40', 40" may be in a disengaged position and the second clutch may be in a disengaged position. The first clutch 40, 40', 40" may not couple the axle shaft 32 to the countershaft 34 when in the disengaged position. Disengaging the first clutch 40, 40', 40" may allow the axle shaft 32 to rotate about the axis 60 with respect to the countershaft 34. The second clutch 42, 42', 42" may not couple the countershaft 34 to the axle housing 30 when in the disengaged position. Disengaging the second clutch 42, 42', 42" may allow the countershaft 34 to rotate about the axis 60 with respect to the axle housing 30. As such, torque that is provided to the axle shaft 32 by the differential may spin the countershaft 34 and may not be transmitted to the hub 36. The open condition may be employed in a 6×2 mode in which torque may be transmitted to one axle assembly in a tandem axle arrangement but not to the other axle assembly, such as may be employed at highway speeds or when torque from multiple axle assemblies is not needed to propel the vehicle at a desired speed.

In the gear reduction condition, gear reduction may be provided from the axle shaft 32 to the hub 36 by the hub gear reduction arrangement 38. In the gear reduction condition, the first clutch 40, 40', 40" may be in the disengaged position and the second clutch 42, 42', 42" may be in an engaged position. The second clutch 42, 42', 42" may couple the countershaft 34 to the axle housing 30 when in the engaged position. As such, the countershaft 34 and the second side gear 112 may not rotate about the axis 60 when the second clutch 42, 42', 42" is in the engaged position. Accordingly, the countershaft 34 and the second side gear 112 may react against the torque that is provided by the axle shaft 32. More specifically, the axle shaft 32 may rotate the first side gear 110, which in turn may transmit torque to the hub 36 via the pinion gears 116 and the spider 114, thereby providing gear reduction that may increase the torque that is provided to an associated wheel 22. The gear reduction condition may be employed in a 6×4 mode in which torque may be transmitted to multiple axle assemblies. The gear reduction condition may be employed when additional torque or traction is needed, such as when climbing a road grade, at low speeds, or when propelling the vehicle from a stationary position.

In the intermediate condition, no gear reduction may be provided from the axle shaft 32 to the hub 36 by the hub gear reduction arrangement 38. The first clutch 40, 40', 40" may be in an engaged position and the second clutch 42, 42', 42" may be in a disengaged position. The first clutch 40, 40', 40" may couple the axle shaft 32 to the countershaft 34 when in the engaged position. As such, the axle shaft 32 and the countershaft 34 may rotate together about the axis 60 when the first clutch 40, 40', 40" is in the engaged position. Accordingly, torque may be transmitted from the axle shaft 32 to the hub without additional gear reduction (i.e., no gear reduction is provided by the hub gear reduction arrangement 38) as the first side gear 110 may not rotate with respect to the second side gear 112, thereby inhibiting rotation of the pinion gears 116 and causing the spider 114 to rotate about the axis 60 with the first side gear 110 and the second side gear 112. The intermediate condition may be employed in a 6×4 mode and may be employed when some torque is needed for traction or to propel the vehicle but desired torque is less than that associated with the gear reduction condition.

In the closed condition, the first clutch 40, 40', 40" may be in the engaged position and the second clutch 42, 42', 42" may be in its engaged position. In the closed condition, torque may not be provided from the axle shaft 32 to the hub 36 as the axle shaft 32 may be inhibited from rotating about the axis 60 with respect to the axle housing 30 due to the coupling of the axle shaft 32 to the countershaft 34 via the first clutch 40, 40', 40" and coupling of the countershaft 34 to the axle housing 30 via the second clutch 42, 42', 42". As such, the hub 36, countershaft 34, and axle shaft 32 may not rotate about the axis 60 in the closed condition. The closed condition, if employed, may be used to act as a parking brake.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an axle housing;
   a countershaft that is disposed in the axle housing and is rotatable about an axis;
   an axle shaft that is disposed in the countershaft and is rotatable about the axis;
   a first clutch that controls rotation of the countershaft with respect to the axle shaft; and
   a second clutch that controls rotation of the countershaft with respect to the axle housing.

2. The axle assembly of claim 1 wherein the countershaft does not rotate about the axis with respect to the axle shaft when the first clutch couples the countershaft to the axle shaft and the countershaft is rotatable about the axis with respect to the axle shaft when the first clutch does not couple the countershaft to the axle shaft.

3. The axle assembly of claim 1 wherein the first clutch extends around the axle shaft and is received inside the countershaft.

4. The axle assembly of claim 3 wherein the first clutch is slidable along the axle shaft and has a first clutch gear that has teeth that extend in an axial direction away from the second clutch and the countershaft has a countershaft gear that has teeth that extend in the axial direction toward the first clutch.

5. The axle assembly of claim 3 wherein the first clutch is slidable along the axle shaft and has a first clutch gear that has teeth that face away from the axis and the countershaft has a countershaft gear that has teeth that face toward the axis and are arranged around the first clutch gear.

6. The axle assembly of claim 1 wherein the countershaft does not rotate about the axis with respect to the axle housing when the second clutch couples the countershaft to the axle housing and the countershaft is rotatable about the axis with respect to the axle housing when the second clutch does not couple the countershaft to the axle housing.

7. The axle assembly of claim 1 wherein the second clutch is disposed in the axle housing proximate a second end of the countershaft.

8. The axle assembly of claim 1 wherein the second clutch extends around the countershaft.

9. The axle assembly of claim 1 wherein the first clutch is disposed closer to the axis than the second clutch.

10. The axle assembly of claim 1 further comprising a hub that is rotatably disposed on the axle housing with a wheel bearing that extends around the axle housing and a countershaft bearing that is disposed in the axle housing and extends around the countershaft to rotatably support the countershaft.

11. The axle assembly of claim 10 wherein the axle shaft is spaced apart from and does not engage the countershaft, the countershaft is spaced apart from and does not engage the axle housing, and the hub is spaced apart from and does not engage the axle housing.

12. An axle assembly comprising:
an axle housing;
a countershaft that is disposed in the axle housing and is rotatable about an axis;
an axle shaft that extends through the countershaft and is rotatable about the axis;
a hub that is rotatably disposed on the axle housing and is rotatable about the axis;
a hub gear reduction arrangement that is disposed in the hub and that transmits torque from the axle shaft to the hub, the hub gear reduction arrangement including:
a first side gear that is disposed on the axle shaft;
a second side gear that is disposed on the countershaft; and
a pinion gear in meshing engagement with the first side gear and the second side gear;
a first clutch that controls rotation of the countershaft with respect to the axle shaft; and
a second clutch that controls rotation of the countershaft with respect to the axle housing.

13. The axle assembly of claim 12 wherein the second clutch and the second side gear are located at opposite ends of the countershaft.

14. The axle assembly of claim 13 wherein the first clutch is axially positioned between the second side gear and the second clutch.

15. The axle assembly of claim 12 wherein the first side gear does not rotate with respect to the axle shaft and the second side gear does not rotate with respect to the countershaft.

16. The axle assembly of claim 15 wherein the axle shaft is rotatable about the axis with respect to the countershaft and the countershaft is rotatable about the axis with respect to the axle housing when the first clutch does not couple the axle shaft to the countershaft and the second clutch does not couple the countershaft to the axle housing.

17. The axle assembly of claim 15 wherein gear reduction from the axle shaft to the hub is provided when the first clutch does not couple the countershaft to the axle shaft so that the axle shaft and the first side gear rotate about the axis with respect to the countershaft and the second clutch couples the countershaft to the axle housing so that the countershaft and the second side gear do not rotate about the axis.

18. The axle assembly of claim 15 wherein no gear reduction is provided from the axle shaft to the hub when the first clutch couples the countershaft to the axle shaft so that the axle shaft, first side gear, countershaft, and second side gear rotate together about the axis and the second clutch decouples the countershaft from the axle housing.

19. The axle assembly of claim 18 wherein the pinion gear does not rotate with respect to the first side gear and the second side gear.

20. The axle assembly of claim 15 wherein the hub, countershaft, and axle shaft do not rotate about the axis when the first clutch couples the axle shaft to the countershaft and the second clutch couples the countershaft to the axle shaft.

* * * * *